United States Patent
Guenzel et al.

(10) Patent No.: US 12,094,215 B2
(45) Date of Patent: Sep. 17, 2024

(54) METHOD FOR DISPLAYING VEHICLE SURROUNDINGS IN A VEHICLE, AND CORRESPONDING DEVICE

(71) Applicant: Bayerische Motoren Werke Aktiengesellschaft, Munich (DE)

(72) Inventors: Florian Guenzel, Neufahrn (DE); Boris Israel, Munich (DE); Hermann Kuenzner, Freising (DE); Frederik Platten, Munich (DE); Wolfgang Spiessl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 531 days.

(21) Appl. No.: 17/274,087

(22) PCT Filed: Aug. 29, 2019

(86) PCT No.: PCT/DE2019/100783
§ 371 (c)(1),
(2) Date: Mar. 5, 2021

(87) PCT Pub. No.: WO2020/048564
PCT Pub. Date: Mar. 12, 2020

(65) Prior Publication Data
US 2021/0192237 A1 Jun. 24, 2021

(30) Foreign Application Priority Data
Sep. 7, 2018 (DE) .................. 10 2018 215 292.6

(51) Int. Cl.
*B60W 40/09* (2012.01)
*G06V 20/58* (2022.01)

(52) U.S. Cl.
CPC ............. *G06V 20/58* (2022.01); *B60W 40/09* (2013.01); *B60W 2420/403* (2013.01); *B60W 2554/4048* (2020.02); *B60W 2554/4049* (2020.02)

(58) Field of Classification Search
CPC .. G06V 20/58; B60W 40/09; B60W 2420/42; B60W 2554/4048; B60W 2554/4049;
(Continued)

(56) References Cited

U.S. PATENT DOCUMENTS

2017/0136878 A1\* 5/2017 Frank ................ G06T 11/60
2017/0334455 A1 11/2017 Asakura et al.
(Continued)

FOREIGN PATENT DOCUMENTS

CN 106536316 A 3/2017
CN 107249952 A 10/2017
(Continued)

OTHER PUBLICATIONS

International Search Report (PCT/ISA/210) issued in PCT Application No. PCT/DE2019/100783 dated Jan. 14, 2020 with English translation (six (6) pages).
(Continued)

*Primary Examiner* — Sheela C Chawan
(74) *Attorney, Agent, or Firm* — Crowell & Moring LLP

(57) ABSTRACT

A method provides a display of vehicle surroundings in a vehicle by detecting the degree of automation at which the vehicle is operated, selecting a set of additional information from one of multiple possible sets of additional information on the basis of the detected degree of automation, wherein each set of additional information includes a different number of pieces of additional information, each piece of additional information describes a display option which visualizes the current state of the vehicle and the corresponding
(Continued)

vehicle surroundings, and a set of additional information selected for a low degree of automation includes less additional information than a set of additional information selected for a degree of automation which is higher than the low degree of automation; and displaying a view of the surroundings of the vehicle. The additional information of the selected set of additional information is visualized in the displayed view.

11 Claims, 4 Drawing Sheets

(58) Field of Classification Search
CPC ............ B60W 50/14; B60W 2050/146; B60K 2370/171; B60K 35/00; B60K 2370/175; B60K 2370/179
USPC .................................................. 382/100, 104
See application file for complete search history.

(56) References Cited

U.S. PATENT DOCUMENTS

| | | |
|---|---|---|
| 2018/0001903 A1 | 1/2018 | Nagy et al. |
| 2018/0154824 A1 | 6/2018 | Urano et al. |

FOREIGN PATENT DOCUMENTS

| | | | |
|---|---|---|---|
| DE | 10 2009 033 752 A1 | 1/2011 | |
| DE | 10 2014 009 985 A1 | 1/2016 | |
| DE | 102014221132 A1 * | 4/2016 | ............ B60W 40/04 |
| DE | 102016208370 A1 | 11/2017 | |
| DE | 10 2017 126 238 A1 | 6/2018 | |
| KR | 100956011 B1 | 5/2010 | |
| WO | WO 2016/058840 A1 | 4/2016 | |

OTHER PUBLICATIONS

German-language Written Opinion (PCT/ISA/237) issued in PCT Application No. PCT/DE2019/100783 dated Jan. 14, 2020 (five (5) pages).

German-language Search Report issued in German Application No. 10 2018 215 292.6 dated Aug. 13, 2019 with partial English translation (12 pages).

Chinese-language Office Action issued in related Chinese Application No. 201980057341.3 dated Dec. 11, 2023 with English translation (17 pages).

* cited by examiner

METHOD FOR DISPLAYING VEHICLE SURROUNDINGS IN A VEHICLE, AND CORRESPONDING DEVICE

BACKGROUND AND SUMMARY OF THE INVENTION

The invention relates to a method for providing a display of vehicle surroundings in a vehicle, and to a corresponding device for providing a display of vehicle surroundings in a vehicle.

In vehicles that support highly automated driving, this highest level of driving assistance will initially be available rather infrequently. Frequently only lower levels of automation will be activated, such as, for example, a speed regulating apparatus with steering assistance. Accordingly, it is expected that there will be many changes between different levels of automation. The level of automation is also referred to as degree of automation. The driver of the vehicle must always be aware of the degree of automation with which the vehicle is currently being operated so that the driver performs the correct actions. In this regard, permanent monitoring of driving control is necessary, for example, in the case of partly automated (SAE Level 2) driving. Permanent monitoring of driving control is not necessary, for example, in the case of highly automated (SAE Level 3) or fully automated (SAE Level 4) driving.

Confusion can arise during a change between different degrees of automation. In this regard, it can happen that the driver of the vehicle is not aware of the degree of automation with which the vehicle is currently being operated. This effect is also referred to as mode confusion. In such a case, it can happen that the driver does not monitor the vehicle, even though he/she should do so, because he/she does not know what automation level he/she is at. Icons and indications often cannot be displayed permanently, and if they can, then often they can clarify the degree of automation only to a limited extent.

It is thus desirable to provide a method for displaying vehicle surroundings which avoids confusion for the driver and nevertheless provides necessary information.

In this case, an environment model displayed in the interior of the vehicle can visually represent the environment detected by the vehicle and associated information. This is done for example by displaying a top view of the ego vehicle and the lanes on the road and other vehicles possibly situated in the environment of the ego vehicle.

The method according to the invention for displaying vehicle surroundings in a vehicle comprises detecting a degree of automation with which the vehicle is operated, selecting a set of additional information from one of a plurality of possible sets of additional information on the basis of the detected degree of automation, wherein each set of additional information comprises in each case a different number of pieces of additional information, wherein each of the pieces of additional information describes a display option which visualizes a current state of the vehicle in an associated vehicle environment, wherein a set of additional information selected for a lower degree of automation comprises less additional information than a set of additional information selected for a higher degree of automation in comparison with the lower degree of automation, and displaying a view of vehicle surroundings of the vehicle, the additional information of the selected set of additional information being visualized in the displayed view.

The degree of automation is often also referred to as automation level. The degree of automation describes the extent to which assistance of a driver is necessary to enable the vehicle to be operated safely. A low degree of automation means that the vehicle is to be steered either completely or almost completely by the driver himself/herself. A high degree of automation means that the vehicle drives completely or almost completely autonomously. The actions required of a driver thus decrease with the degree of automation present. By contrast, the actions carried out autonomously by the vehicle increase with the degree of automation.

A set of additional information is selected. Each piece of additional information describes a display option which enables a specific type of information to be visualized. In this case, the type of information to be visualized is, in particular, information detected by a sensor system of the vehicle. Exemplary display options are visualization of adjacent vehicles, visualization of distance information with respect to adjacent vehicles, visualization of speeds of adjacent vehicles or visualization of traffic signs. In this case, the visualization can be effected in particular graphically, for example by displaying three-dimensional objects, and/or in written form, for example by displaying a speed value or a distance.

Preferably, exactly one set of additional information is stored for each degree of automation that can be adopted by the vehicle. If the vehicle is operated with a specific degree of automation, then the corresponding associated set of additional information is selected. A set of additional information selected for a lower degree of automation comprises less additional information than a set of additional information selected for a higher degree of automation in comparison with the lower degree of automation. That is to say that for a lower degree of automation less additional information is selected and thus visualized by the associated set than for a comparatively higher degree of automation. That means, in other words, that as the degree of automation increases, more additional information is selected and thus visualized, since the correspondingly selected set of additional information comprises more additional information as the degree of automation increases.

A view of vehicle surroundings of the vehicle is displayed. The view of the vehicle surroundings can either be a three-dimensional image of the vehicle surroundings, which is generated for example digitally on the basis of a surroundings model, or can be a camera image or a composite view made of a plurality of camera images. The view of the vehicle surroundings is thus a graphical representation of the surroundings of the vehicle. In this view of the vehicle surroundings of the vehicle, the additional information is represented, that is to say that selected information is represented on the basis of the display options defined with the additional information, which are defined in the respectively selected set of additional information. It goes without saying that the additional information is displayed only if the information to be displayed which forms the basis for the display is actually available. If the additional information from a set of additional information is for example a display option for a distance value with respect to an adjacent vehicle, then this additional information is displayed, of course, only if there is an adjacent vehicle in the vicinity of the vehicle. If no adjacent vehicle is available, then no distance value can be detected and, consequently, the latter cannot be visualized either. The additional information in the sets of additional information should thus be understood as a display option defining that additional information is displayed if the latter is available. According to the invention, therefore, with the vehicle surroundings remaining the same, more information is represented in the view of the vehicle surroundings as the degree of automation of the vehicle increases.

Displaying vehicle surroundings in a vehicle according to the invention is advantageous since a driver of the vehicle, particularly if the vehicle is operated with low degree of automation, receives only little information displayed in the view of the vehicle surroundings. The driver of the vehicle is therefore not distracted from control of the vehicle, in which case, furthermore, no important information is lost since the driver is able to read information from a displayed view of the vehicle surroundings only to a limited extent anyway.

If the vehicle is operated with a high degree of automation, however, then the driver can also concentrate on the view of the vehicle surroundings of the vehicle and read additional information. A particularly intuitive display is provided, moreover, since the high number of pieces of additional information in the case of a higher degree of automation indicates that the vehicle is detecting a large amount of information and is thus able to act autonomously, that is to say with a high degree of automation.

Furthermore, a required computing power for generating the view decreases for a smaller number of pieces of additional information. Consequently, by way of example, it is possible to minimize a power consumption of the vehicle for a low degree of automation. Consequently, particularly little energy is required by an associated computing system and in the event of weak battery power of an electric vehicle, for example, the vehicle can be still driven particularly far with a low degree of automation, for example in a battery saving mode.

It is advantageous if displaying the view of the vehicle surroundings furthermore involves choosing a perspective of an observer of the vehicle surroundings in accordance with the detected degree of automation. In this regard, it is possible to choose the perspective in the case of a high degree of automation for example such that a particularly wide environment of the vehicle is displayed. Consequently, more additional information can be displayed. Conversely, for a low degree of automation, the display of the environment can be calculated particularly simply.

Moreover, it is advantageous if the perspective of the observer changes to an observation point located higher as the degree of automation increases. The displayed viewing region is thus chosen such that in particular the field of view that is relevant to the driving of the vehicle is displayed in the case of a low degree of automation and a further environment of the vehicle, for example behind the vehicle, is additionally displayed as well as the degree of automation increases. In this way, too, a degree of information in the displayed view is increased as the degree of automation increases.

In particular, it is advantageous if the perspective of the observer changes from a driver's perspective to a bird's eye perspective as the degree of automation increases. If the driver observes the view of the vehicle surroundings in the driver's perspective, then precisely the information necessary for the driving of the vehicle is displayed to the driver and at the same time a not very technical display is conveyed which makes it clear to the driver that the latter himself/herself is responsible for the driving of the vehicle, that is to say that a low degree of automation is present. If the displayed vehicle environment changes to a bird's eye perspective, then it is possible to provide additional information for the environment of the vehicle. At the same time, it is made clear to the driver that the vehicle is operated with a high degree of automation, since the chosen view corresponds rather to an observer role, for example comparable to a computer game.

Preferably, the set of additional information for a lowest possible degree of automation includes no additional information. Consequently, no additional information whatsoever is provided for the lowest degree of automation, typically for manual driving. The driver's gaze is thus not directed to the view of the vehicle surroundings. Additional graphics processors can optionally be switched off.

Moreover, it is advantageous if one of four possible degrees of automation is detected, wherein the four possible degrees of automation are in particular manual driving, partly automated driving, highly automated driving and fully automated driving. Restricting the possible degrees of automation to four prevents confusion of the driver from being produced owing to too many possible views.

Moreover, it is advantageous if at least one of the sets of additional information comprises a visualization option for displaying three-dimensional objects in the view of the vehicle surroundings. The visualization option for displaying three-dimensional objects is a piece of additional information. That means that with one of the sets of additional information an additional type of three-dimensional objects is inserted into the view of the vehicle surroundings. Consequently, a fidelity of detail in the view of the vehicle surroundings can be increased if the degree of automation increases.

In this case, it is advantageous if a set of additional information selected for a low degree of automation comprises comparatively fewer visualization options for displaying three-dimensional objects than a set of additional information selected for a comparatively higher degree of automation. This therefore prevents visualization options for displaying three-dimensional objects from diminishing as the degree of automation increases. This ensures that the view of the vehicle surroundings becomes more highly detailed as the degree of automation increases.

Preferably, each set of additional information is furthermore assigned a color scheme for displaying the view of the vehicle surroundings and/or the additional information. In this case, a different color scheme is assigned to at least two of the sets of additional information. In this way, the degree of automation with which the vehicle is operated can be made clear to the driver by means of a color indication.

A device for providing a display of vehicle surroundings in a vehicle comprises a computing unit configured to carry out the method according to the invention. The device according to the invention has all the advantages of the method according to the invention.

Further details, features and advantages of the invention are evident from the following description and the figures.

DETAILED DESCRIPTION OF THE DRAWINGS

Figure 1:
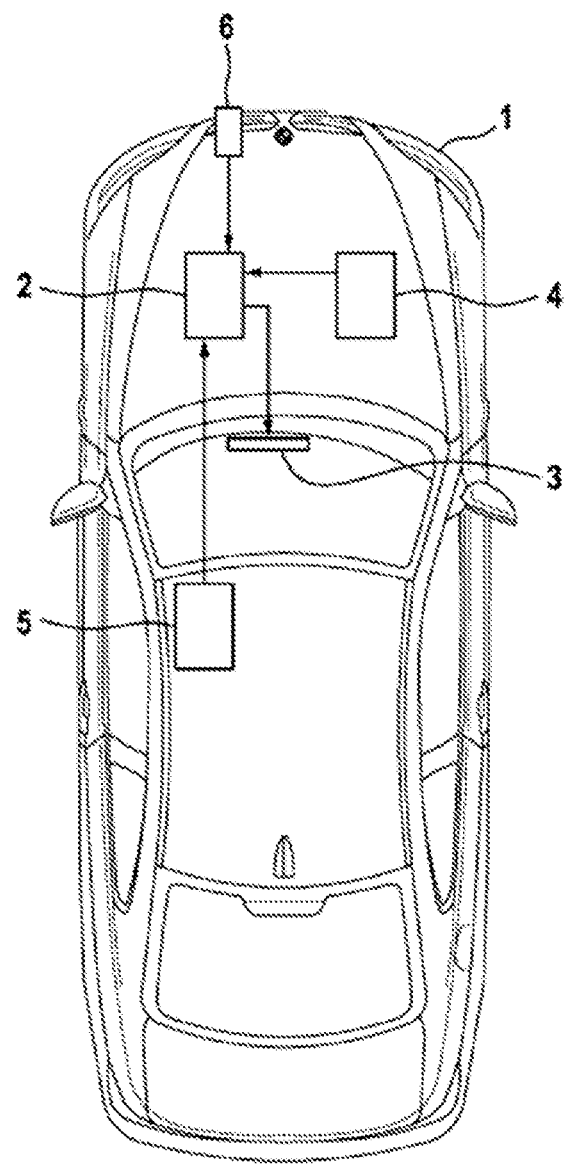
FIG. 1 shows a vehicle with a device for providing a display of vehicle surroundings in a vehicle in accordance with one embodiment of the invention.

FIG. 1 shows a vehicle 1 comprising a device for providing a display of vehicle surroundings in a vehicle in accordance with one embodiment of the invention. To that end, the vehicle 1 comprises a computing unit 2 configured to carry out the method for providing a display of vehicle surroundings in the vehicle 1.

The vehicle 1 comprises vehicle electronics 4 suitable for operating the vehicle 1 with different degrees of automation, that is to say for performing longitudinal and/or lateral control of the vehicle 1. Different degrees of automation are supported by the vehicle electronics 4. In this regard, on the vehicle electronics 4 it is possible to select whether the vehicle is intended to be driven manually, partly automated driving is intended to take place, highly automated driving is intended to take place, or fully automated driving is intended to take place. In the case of manual driving, the driver of the vehicle 1 takes on full control of the vehicle 1. In the case of partly automated driving, the vehicle electronics 4 intervene in the driver's driving behavior to a limited extent, for example by way of a lane keeping assistant. In the case of highly automated driving, largely all steering functions, that is to say all longitudinal and lateral control functions, are performed by the vehicle electronics 4, although it is still necessary for the driver to monitor the actions of the vehicle electronics 4. If highly automated driving is selected, then the vehicle electronics 4 take on full longitudinal and lateral control of the vehicle 1.

In this embodiment, the vehicle 1 comprises an environment sensor system 5 embodied as a LiDAR system, for example. By means of the environment sensor system 5, surroundings of the vehicle 1 are scanned and information regarding the surroundings of the vehicle 1 is detected. The environment sensor system 5 can alternatively or additionally also comprise ultrasonic sensors, rain sensors or other sensors. The environment sensor system 5 is suitable for detecting information from the environment of the vehicle.

The vehicle 1 furthermore comprises a camera system 6, which detects a view of the vehicle surroundings in which the vehicle 1 is situated. The camera system 6 comprises at least one camera, but can also comprise a plurality of cameras.

Furthermore, a display 3 is arranged in an interior of the vehicle 1, information for a driver of the vehicle 1 being displayed on the display. For this purpose, the display 3 is provided with an image signal by the computing unit 2.

If the method according to the invention is carried out, then firstly a degree of automation with which the vehicle 1 is currently being operated is detected. To that end, the vehicle electronics 4 are interrogated by the computing unit 2 in respect of the degree of automation. Information stating whether the vehicle 1 is being driven manually, is being driven in a partly automated manner, is being driven in a highly automated manner or is being driven in a fully automated manner is thus transmitted from the vehicle electronics 4 to the computing unit 2. In this case, the vehicle electronics 4 here are a system for the automated driving of the vehicle 1 with different degrees of automation.

Once the degree of automation has been detected, a set of additional information is selected from one of a plurality of sets of additional information on the basis of the detected degree of automation. To that end, a respective set of additional information is assigned to each of the four possible degrees of automation. In this regard, a first set of additional information is assigned to manual driving, a second set of additional information is assigned to partly automated driving, a third set of additional information is assigned to highly automated driving and a fourth set of additional information is assigned to fully automated driving.

The first set of additional information comprises no additional information. The first set of additional information is thus empty. That means that the first set of additional information for the lowest possible degree of automation includes no additional information. Consequently, no display option that visualizes a current state of the vehicle 1 in an associated vehicle environment is chosen for the first set of additional information.

The second set of additional information comprises three additional options. Three display options that visualize a current state of the vehicle 1 in the associated vehicle environment are thus chosen. In this regard, the three display options specify that adjacent vehicles 12 are displayed as a three-dimensional model, that movement trajectories or speed indicators 13 of adjacent vehicles 12 are displayed and that approaches of vehicles ahead are marked by an approach marking 14.

The third set of additional information likewise comprises three additional options. In this case, the third set of additional information comprises the same pieces of additional information as the second set of additional information does. Three display options that visualize a current state of the vehicle 1 in the associated vehicle environment are thus chosen. In this regard, the three display options specify that adjacent vehicles 12 are displayed as a three-dimensional model, that movement trajectories or speed indicators 13 of adjacent vehicles 12 are displayed and that approaches of vehicles ahead are marked by an approach marking 14.

The fourth set of additional information comprises seven additional options. Seven display options that visualize a current state of the vehicle 1 in the associated vehicle environment are thus chosen. In this regard, the seven display options specify that adjacent vehicles 12 are displayed as a three-dimensional model, that movement trajectories or speed indicators 13 of adjacent vehicles 12 are displayed, that approaches of vehicles ahead are marked by an approach marking 14, that traffic signs 16 are displayed as three-dimensional objects, that buildings 17 are displayed as three-dimensional objects, and that distance information 15 with respect to adjacent vehicles 12 is displayed numerically.

It is evident that the first, second and fourth sets of additional information each comprise a different number of pieces of additional information. The first set of additional information comprises less additional information than the fourth set of additional information. At the same time, manual driving is a comparatively lower degree of automation than fully automated driving. Consequently, a set of additional information for a lower degree of automation, namely manual driving, comprises comparatively fewer display options than a set of additional information selected for a comparatively higher degree of automation, here the fourth set of additional information for fully automated driving. Consequently, more additional information is provided as the degree of automation increases.

Once a set of additional information has been selected, a view 10 of vehicle surroundings of the vehicle 1 is displayed, the additional information of the selected set of additional information being visualized in the displayed view 10.

Displaying the view 10 of vehicle surroundings is effected by outputting an image of the vehicle surroundings on the display 3, said image being calculated by the computing unit 2. For this purpose, in the simplest case, a camera image is reproduced in order to display the vehicle surroundings.

In the embodiment of the invention described here, a perspective of an observer of the vehicle surroundings is changed with the degree of automation. For this purpose, the view of the vehicle surroundings is determined computationally. For this purpose the vehicle surroundings are scanned by means of the environment sensor system 5 and a three-dimensional model of the vehicle surroundings is created. It is pointed out that there are various techniques for providing a view of the vehicle surroundings of the vehicle 1 from different perspectives. In this regard, by way of example, it is also possible for camera images to be projected onto a virtual projection area in a virtual space in order to produce a photorealistic view of the vehicle surroundings from different perspectives.

Figure 3A:
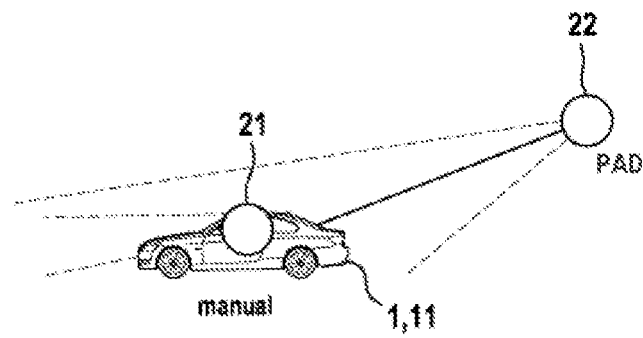
FIGS. 3a and 3b show a schematic illustration of different perspectives of an observer for the view of the vehicle surroundings in accordance with the described embodiment of the invention.
Figure 3B:
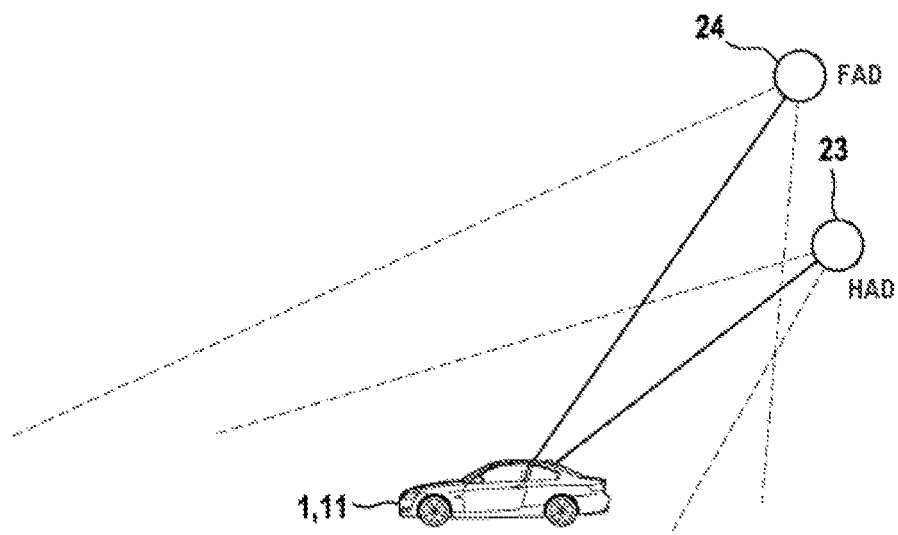

Displaying the view 10 of the vehicle surroundings involves choosing a perspective of an observer of the vehicle surroundings in accordance with the detected degree of automation. This is illustrated by way of example in FIGS. 3a and 3b. In this case, FIG. 3a illustrates an observation point 21 of the observer of the vehicle surroundings for the lowest degree of automation, that is to say for manual driving. Furthermore, FIG. 3a illustrates an observation point 22 of the observer for partly automated driving. FIG. 3b illustrates an observation point 23 of the observer for highly automated driving 23 and the observation point 24 of the observer for fully automated driving 24. In this case, the observation point 21 to 24 describes where a camera is arranged, from the perspective of which the view of the vehicle surroundings of the vehicle 1 is generated. In this case, the camera is not actually arranged at this location; only the view of the vehicle surroundings is calculated as though a camera were arranged at the corresponding observation position in order to detect the vehicle surroundings. It is evident from FIGS. 3a and 3b that the perspective of the observer, that is to say the observation point 21 to 24, changes to an observation point located higher as the degree of automation increases.

In this regard, the observation point 21 of the observer for manual driving is arranged at a first height, here at the driver's eye level. For partly automated driving, the observation point 22 of the observer for partly automated driving is arranged at a second height behind the rear of the vehicle 1, the second height being greater than the first height. For highly automated driving, the observation point 23 of the observer for highly automated driving is arranged at a third height behind the rear of the vehicle 1, the third height being greater than the second height. For fully automated driving, the observation point 24 of the observer for fully automated driving is arranged at a fourth height behind the rear of the vehicle 1, the fourth height being greater than the third height. In this case, height describes a distance above a surface on which the vehicle 1 is situated. In this case, a viewing direction of the displayed view 10 for manual driving is directed in the direction of travel of the vehicle 1. For the other degrees of automation, the viewing direction is directed at the vehicle 1, that is to say at a model of the vehicle 1.

It goes without saying that FIGS. 3a and 3b illustrate a schematic arrangement of the vehicle 1 and of the observation point 21 to 24 of the observer. In this case, FIGS. 3a and 3b can be understood to describe the observation position in the real world, or to describe the observation position in a corresponding three-dimensional model of the real world. What is crucial here is that the view of the vehicle surroundings is displayed as though the observation point had been chosen in the real world in a manner as illustrated in FIGS. 3a and 3b, that is to say as though a camera had been arranged at this location.

As a result of the chosen positioning of the observation point 21 to 24 of the observer, the perspective of the observer changes to an observation point located higher as the degree of automation increases. In this regard, the observation point 22 to 24 of the observer changes from the driver's eye level to the fourth height. What is thus achieved is that the perspective of the observer changes from a driver's perspective to a bird's eye perspective as the degree of automation increases.

Figure 2A:
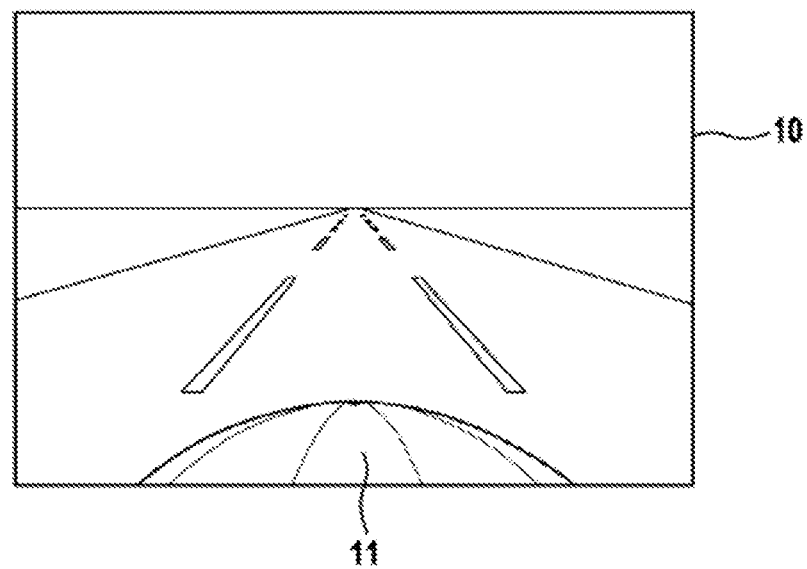
FIGS. 2a to 2d each show an exemplary view of vehicle surroundings of the vehicle for different degrees of automation.

The additional information of the respectively selected set of additional information is represented in the view of the vehicle surroundings of the vehicle 1 that is represented on the display 3. This is illustrated by way of example in FIGS. 2a to 2d. In this case, FIG. 2a shows the displayed view 10 with the additional information of the first set of additional information for manual driving. The first set of additional information comprises no additional information. It is thus evident from FIG. 2a that only the vehicle surroundings of the vehicle 1 is displayed. In this case, the vehicle 1 is represented by a three-dimensional model 11 of the vehicle 1. Otherwise, the vehicle surroundings of the vehicle 1 is displayed as empty. In reality, at the time for which the view 10 shown in FIG. 2a is displayed, a traffic light, for example, may be situated in front of the vehicle 1. This traffic light is not shown in the view 10, however, since no corresponding display option is defined as additional information in the first set of additional information. It is evident that an observation point is at the driver's eye level, that is to say is at the first height. The viewing direction is directed in the direction of travel. Therefore, only a portion of the three-dimensional model 11 of the vehicle 1 is evident.

Figure 2B:
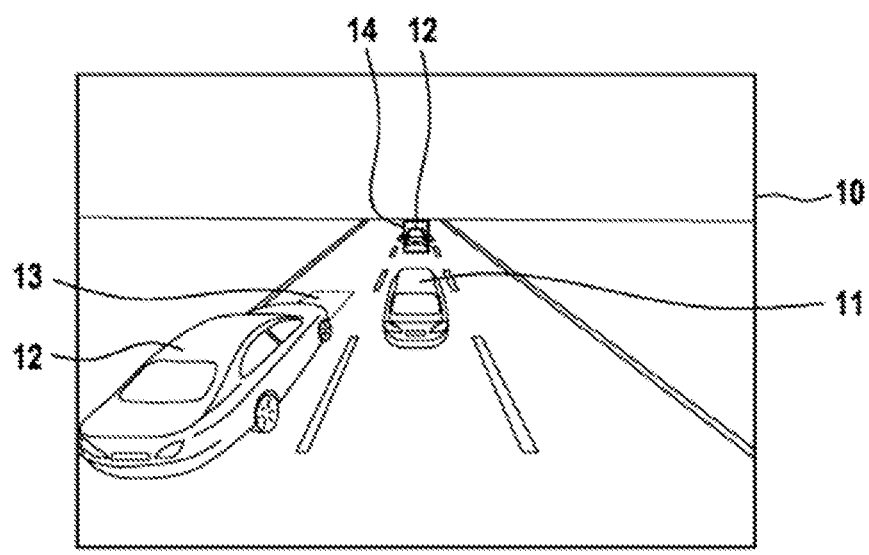

FIG. 2b shows the view 10 of the vehicle surroundings of the vehicle 1 with the additional information contained in the second set of additional information. In this regard, vehicles 12 adjacent to the vehicle 1 are displayed in this view 10. At the same time, a speed of these adjacent vehicles 12 is displayed in each case by a speed indicator 13 embodied as a color strip. An approach of vehicles ahead is displayed by an approach marking 14. In this case, the approach marking 14 is embodied as a box around the approaching vehicle ahead. It is furthermore evident that the actual display of additional information, that is to say the use of possible display options, is dependent on whether corresponding information is present. In this regard, the information required for displaying adjacent vehicles 12 is obtained for example by the vehicle surroundings of the vehicle 1 being scanned by the environment sensor system 5. If the environment sensor system 5 detects no adjacent vehicles, then adjacent vehicles 12 are also not displayed in the displayed view. It is evident that an observation point has risen to a greater height, that is to say to the first height. At the same time, a viewing direction is directed at the three-dimensional model 11 of the vehicle 1. A low-level bird's eye perspective is thus generated as view 10.

Figure 2C:
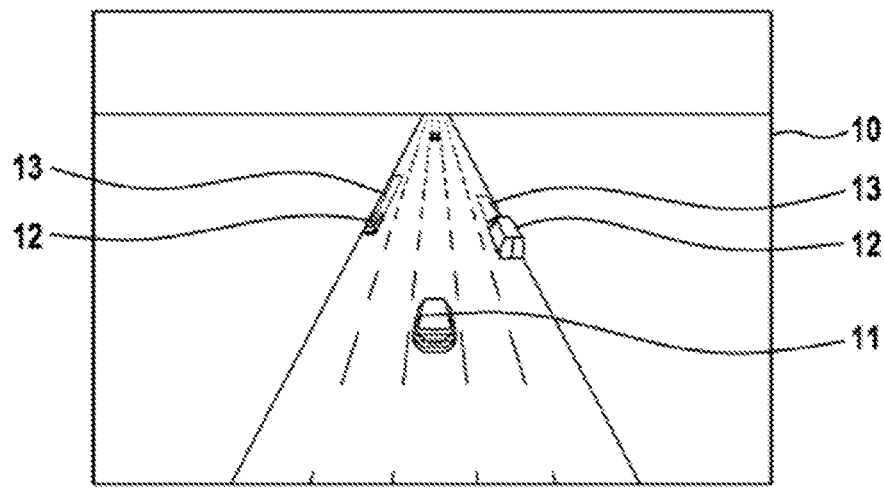

FIG. 2c shows the view 10 of the vehicle surroundings of the vehicle 1 for highly automated driving. It is evident that an observation point has risen to a greater height, that is to say to the second height. The perspective of the observer has thus moved in the direction of a higher bird's eye perspective. The same additional information as for partly automated driving is displayed. In this regard, vehicles 12 adjacent to the vehicle 1 are displayed in the view 10. At the same time, a speed of these adjacent vehicles 12 is displayed in each case by a speed indicator 13 embodied as a color strip. An approach of vehicles ahead would be displayed by an approach marking 14 as also in the view 10 for partly automated driving known from FIG. 2b. However, since there is no approach of vehicles ahead in the scenario illustrated in FIG. 2c, the corresponding display option is not used.

Figure 2D:
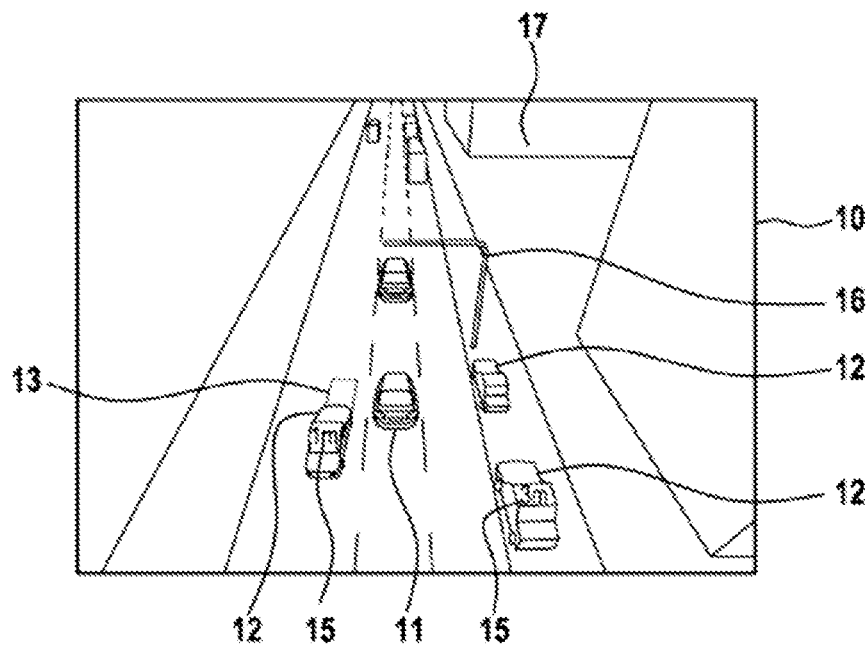

FIG. 2d shows the view 10 of the vehicle surroundings of the vehicle 1 with the displayed additional information of the fourth set of additional information for fully automated driving. It is evident that now traffic signs 16 and buildings 17 are likewise visualized as three-dimensional objects. Furthermore, distance information 15 for adjacent vehicles 12 is inserted numerically. The observation point has risen to the third height and a high bird's eye perspective is thus displayed. The view 10 for fully automated driving thus comprises the most additional information and has the highest amount of information.

In the embodiment described here, the additional information is not restricted to numerical information, as illustrated for example for the distance information 15 in the view 10 for fully automated driving in FIG. 2d. In this regard, most of the pieces of additional information are a visualization option for displaying three-dimensional objects in the view of the vehicle surroundings. In this regard, by way of example, the adjacent vehicles 12, the traffic signs 16 and buildings 17 are displayed as three-dimensional objects.

In further embodiments of the invention, each set of additional information is furthermore assigned a color scheme for displaying the view of the vehicle surroundings and/or the additional information. In this regard, by way of example, a coloration of the adjacent vehicles can be chosen to be more dominant as the degree of automation increases. In this regard, by way of example, a saturation of the three-dimensional models that display adjacent vehicles 12 can be increased with the degree of automation.

Besides the disclosure above, reference is explicitly made to the disclosure of the figures.

LIST OF REFERENCE SIGNS

1 Vehicle
2 Computing unit
3 Display
4 Vehicle electronics
5 Environment sensor system
6 Camera system
10 View
11 Three-dimensional model of the vehicle
12 Adjacent vehicles
13 Speed indicator
14 Approach marking
15 Distance information
16 Traffic sign
17 Building
21 Observation point for manual driving
22 Observation point for partly automated driving
23 Observation point for highly automated driving
24 Observation point for fully automated driving

What is claimed is:

1. A method for providing a display of vehicle surroundings in a vehicle, comprising:
    detecting a degree of automation with which the vehicle is operated;
    selecting a set of additional information from one of a plurality of possible sets of additional information on the basis of the detected degree of automation, wherein
        each set of additional information comprises in each case a different number of pieces of additional information;
        each of the pieces of additional information describes a display option which visualizes a current state of the vehicle in an associated vehicle environment; and
        a set of additional information selected for a lower degree of automation comprises less additional information than a set of additional information selected for a higher degree of automation in comparison with the lower degree of automation; and
    displaying a view of vehicle surroundings of the vehicle, the additional information of the selected set of additional information being visualized in the displayed view;
    wherein displaying the view of the vehicle surroundings further comprises choosing a perspective of an observer of the vehicle surroundings in accordance with the detected degree of automation.

2. The method according to claim 1, wherein
the perspective of the observer changes to an observation point located higher as the degree of automation increases.

3. The method according to claim 1, wherein
the perspective of the observer changes from a driver's perspective to a bird's eye perspective as the degree of automation increases.

4. The method according to claim 1, wherein
the set of additional information for a lowest possible degree of automation includes no additional information.

5. The method as claimed in claim 1, wherein
one of four possible degrees of automation is detected, which are: (i) in particular manual driving, (ii) partly automated driving, (iii) highly automated driving, and (iv) fully automated driving.

6. The method according to claim 1, wherein
at least one of the sets of additional information comprises a visualization option for displaying three-dimensional objects in the view of the vehicle surroundings.

7. The method according to claim 6, wherein
a set of additional information selected for a low degree of automation comprises comparatively fewer visualization options for displaying three-dimensional objects than a set of additional information selected for a comparatively higher degree of automation.

8. The method according to claim 1, wherein
each set of additional information is further assigned a different color scheme for displaying the view of the vehicle surroundings and/or the additional information.

9. A device for providing a display of vehicle surroundings in a vehicle, comprising:
    a computing unit and associated memory storing program code which, when executed, causes the device to:
    detect a degree of automation with which the vehicle is operated;
    select a set of additional information from one of a plurality of possible sets of additional information on the basis of the detected degree of automation, wherein
        each set of additional information comprises in each case a different number of pieces of additional information;
        each of the pieces of additional information describes a display option which visualizes a current state of the vehicle in an associated vehicle environment; and
        a set of additional information selected for a lower degree of automation comprises less additional information than a set of additional information selected for a higher degree of automation in comparison with the lower degree of automation; and display a view of vehicle surroundings of the vehicle, the additional information of the selected set of additional information being visualized in the displayed view, and a perspective of an observer of the vehicle surroundings being chosen in accordance with the detected degree of automation.

10. A method for providing a display of vehicle surroundings in a vehicle, comprising:

detecting a degree of automation with which the vehicle is operated;

selecting a set of additional information from one of a plurality of possible sets of additional information on the basis of the detected degree of automation, wherein each set of additional information comprises in each case a different number of pieces of additional information;

each of the pieces of additional information describes a display option which visualizes a current state of the vehicle in an associated vehicle environment; and a set of additional information selected for a lower degree of automation comprises less additional information than a set of additional information selected for a higher degree of automation in comparison with the lower degree of automation; and displaying a view of vehicle surroundings of the vehicle, the additional information of the selected set of additional information being visualized in the displayed view; wherein at least one of the sets of additional information comprises a visualization option for displaying three-dimensional objects in the view of the vehicle surroundings.

11. The method according to claim 10, wherein a set of additional information selected for a low degree of automation comprises comparatively fewer visualization options for displaying three-dimensional objects than a set of additional information selected for a comparatively higher degree of automation.

* * * * *